Nov. 14, 1939.  P. M. HALL  2,180,098
TREAD LINK FOR TIRE CHAINS
Filed April 2, 1937   2 Sheets-Sheet 1
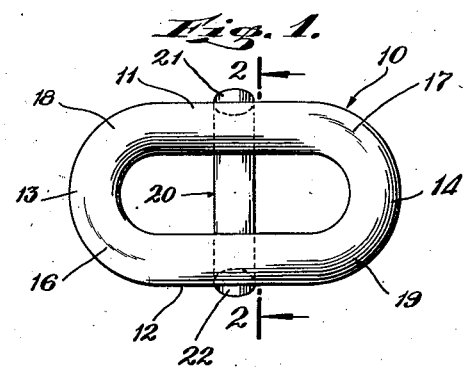
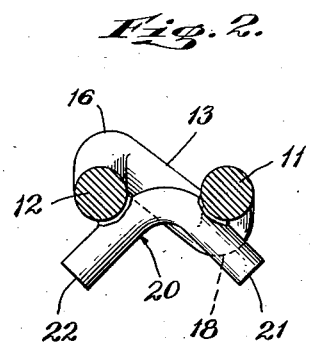
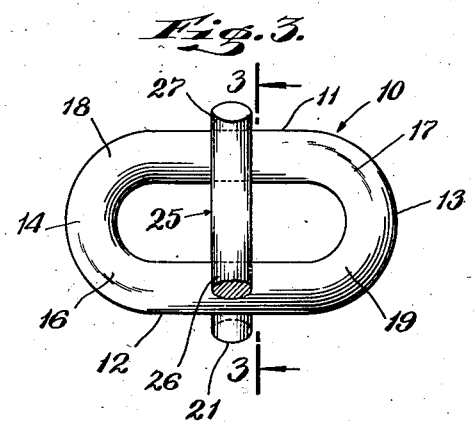
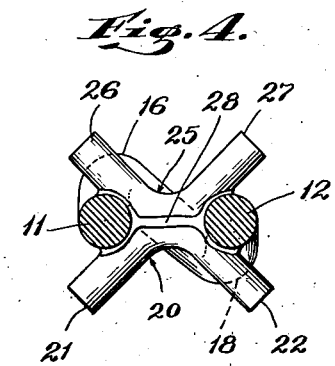
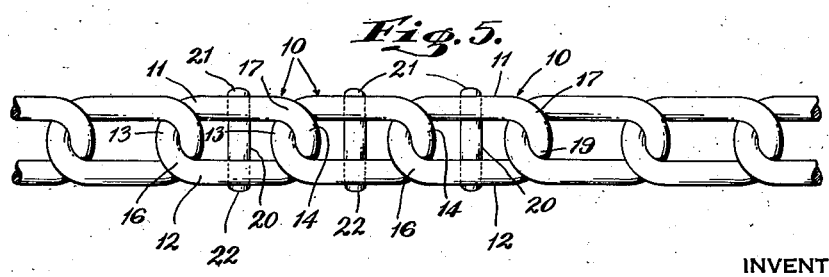
INVENTOR
PRESTON M. HALL
BY
ATTORNEY Nov. 14, 1939.   P. M. HALL   2,180,098
TREAD LINK FOR TIRE CHAINS
Filed April 2, 1937   2 Sheets-Sheet 2
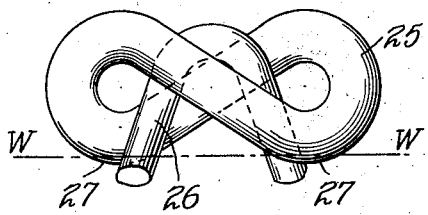
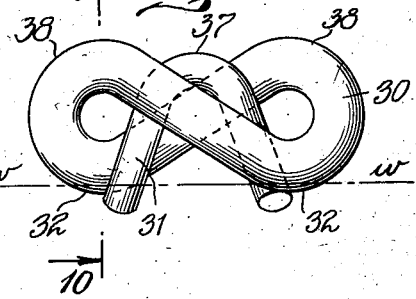
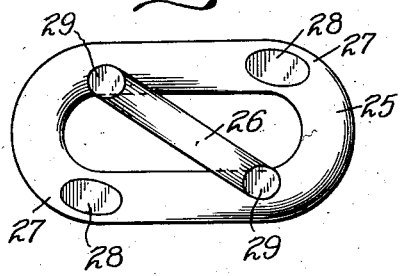
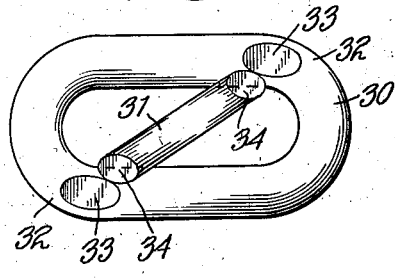
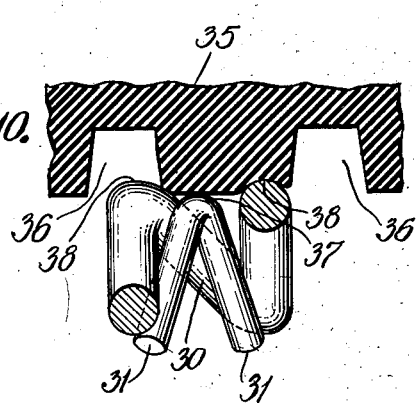
INVENTOR
PRESTON M. HALL
BY
ATTORNEY Patented Nov. 14, 1939

2,180,098

UNITED STATES PATENT OFFICE 2,180,098

TREAD LINK FOR TIRE CHAINS

Preston M. Hall, Worcester, Mass., assignor to American Chain & Cable Company, Inc., New York, N. Y., a corporation of New York Application April 2, 1937, Serial No. 134,508

15 Claims. (Cl. 152—245)

The present invention relates to cross chains of tire chain assemblies and has for an object to provide means adapted to prevent skidding of a vehicle wheel equipped with such chains.

It is customary to use curb links for the tread portions of a tire chain, and the so-called "high points" of these links, namely, the lobes at the twisted ends of the links which extend outwardly to the greatest extent from the tire, are pressed into the road surface and provide a high degree of traction. However, these lobes are most subject to wear and in time develop flat spots which tend to promote rather than prevent skidding on ice or other hard, smooth surfaces.

An object of my invention is to provide the tread links of a cross chain with calks adapted to increase the traction and take the brunt of the wear, thereby materially lengthening the efficient life of the tread links.

Another object of my invention is to provide a link with a calk that will serve as a reinforcement tying the side strands of the link together.

A more specific object of the invention is to provide a calk bent substantially to the form of an inverted V, with the apex of the V introduced between the side strands of the link and welded thereto, and with the legs of the V flaring outwardly beyond the road face of the link and also beyond the sides of the link, that is, toward the front and rear with respect to the normal direction of travel of the wheel. Hereinafter the tread link will be considered as in road-engaging position, and the "bottom" of the link will be understood to mean the road face of the link, and the "top" of the link, the surface which faces the tire.

It will be understood that my improved calk may be applied to tread links not only of the curb type but of other types as well. In the preferred form of my invention the calks are made of round stock and this is of particular advantage in applying the calks to curb links. If flat stock were used it would have to be twisted to lie flat against the oppositely inclined side strands of a curb link. Round stock on the other hand will make a point contact with the side strands no matter what the relative inclination of the strands may be and no matter whether the V lies in a plane normal to the longitudinal axis of the link or obliquely with respect to said axis. The initial point contact is of advantage in welding the parts together, it being understood, of course, that the area of contact is spread to form a broad weld spot as the welding proceeds.

A further object of my invention is to provide a tread link which is reversible, and to this end my invention includes a tread link with a V-shape calk projecting from each face of the link, these calks being welded to the side strands and preferably welded to each other as well.

An advantage of my construction is that the side strands of the link are bound together by the calk or calks (as the case may be) thereby materially strengthening the link.

Other objects and advantages of my invention will appear in the following description of a preferred embodiment and thereafter the novelty and scope of the invention will be pointed out in the claims.

In the accompanying drawings:

Figure 1 is a top plan view of a curb link provided with my improved calk;

Fig. 2 is a view in cross section taken on the line 2—2 of Fig. 1, showing the tread link in road engaging position;

Fig. 3 is a plan view of a reversible tread link with a calk projecting from each face thereof;

Fig. 4 is a view in cross section taken on the line 3—3 of Fig. 3;

Fig. 5 is a top plan view of a portion of a cross chain including several tread links of the type depicted in Fig. 1;

Fig. 6 is a view in side elevation of a modification;

Fig. 7 is a bottom plan view of the same showing the appearance of the link after being worn down in service to the plane W—W of Fig. 6;

Fig. 8 is a view in side elevation of still another modification;

Fig. 9 is a bottom plan view of the same showing the appearance of the link after it has been worn down in service to the plane w—w of Fig. 8; and, Fig. 10 is a view in cross-section taken on line 10—10 of Fig. 8 showing a fragment of the tread portion of a tire bearing thereon.

In the particular embodiments illustrated in the drawings, I have shown my invention as applied to tread links of the curb type. Thus, in Fig. 1, I show a link 10 comprising a pair of side strands 11 and 12 respectively, the opposite ends of which are connected by arcuate end portions 13 and 14. This link is twisted so that the end portions 13 and 14 lie in oppositely inclined planes and the sides 11 and 12 are correspondingly oppositely inclined. The lobe 16 formed at the junction of end 13 and side strand 12 and the diagonally opposite lobe 17 formed at the junction of end 14 and side strand 11 are raised, while the other two lobes 18 and 19 are depressed with respect to the plane of the drawings. The lobes 16 and 17 normally bear against the tire, and when the link is in ground engaging position, were it not for a calk 20, which will be described presently, the lobes 18 and 19 would normally rest on the ground.

The calk 20 is formed of round stock bent substantially to the shape of an inverted V, as shown in Fig. 2, and then applied to the link with the legs 21 and 22 of the V projecting downwardly and flaring outwardly beyond the link proper. Preferably, the calk is applied to the link in such position that it lies in a plane normal to the longitudinal axis of the link, as shown in Fig. 1, but if desired the plane of the calk may be inclined with respect to said longitudinal axis. No matter at what angle the plane of the calk may lie with respect to the longitudinal axis of the link, there will be a point contact between each leg of the calk and the side strands to which it is to be welded. The calk is now welded fast and the contacting parts will be united by weld spots of broad area, as indicated in Fig. 2.

Fig. 5 illustrates the appearance of a cross chain including several of my improved tread links. It will be evident that the legs 21 and 22 of the calks will take the brunt of the load and wear, and because of their relatively small cross-section they are better adapted to dig into the road surface than are the lobes 18 and 19. Preferably, the legs of each calk are disposed at an angle of approximately 90 degrees to each other.

In Figs. 3 and 4, I have shown a link which corresponds in every respect to the link shown in Figs. 1 and 2 except that it is provided with a V-shape calk projecting from each face thereof so that the link is reversible. Corresponding parts in the two sets of drawings are therefore indicated by the same reference numerals. The additional calk 25 is of the same shape as the calk 20 and is applied to the link with the apex of the V disposed between the side strands 11 and 12, so that the legs 26 and 27 of the V project upwardly from the link and flare outwardly beyond the side strands 11 and 12 respectively. Not only are the calks 25 and 20 welded to the side strands 11 and 12, but the apices of the calks are brought into mutual contact and are welded together, as indicated at 28. The link shown in Figs. 3 and 4 is stronger than that shown in Figs. 1 and 2 because of the double reinforcement connecting side strands 11 and 12. Also, as the calks wear down on one side the chain may be inverted to bring the opposite calks into operative engagement with the road, thereby materially extending the life of the link.

Instead of disposing the V-shaped calk in a plane normal to the longitudinal axis of the link it may to advantage be disposed at a wide angle thereto. Thus, in Figs. 6 and 7, I show a link 25 with a V-shaped calk 26 welded thereto but lying in a vertical plane veering away from the depending lobes 27 of the link. When this tread member has worn down in service to the plane W—W it will have a four-point contact with the road as will be readily apparent from an inspection of Fig. 7. Flats 28 will be formed on each of the depending lobes 27 and the ends of the V-shaped calk will be worn down to form flats 29.

Instead of twisting the plane of the calk away from the depending lobes, it may be turned toward them as shown in Figs. 8 and 9. In these figures a curb link 30 has a V-shaped calk 31 welded thereto and the free ends of this calk are adjacent to and project below the depending lobes 32 of the link. When this link is worn down in service to a plane w—w so that wear takes place on the depending lobes as well as on the calks, the link will continue to have substantially a two-point contact with the road. Thus, as viewed in Fig. 9, flats 33 are formed on the lobes 32 and flats 34 are formed on the free ends of the V-shaped calk. However, the flats 34 merge into the flats 33 so that the points of support of the tread member on the road are at two diagonally opposed spots instead of at four spots, as in Fig. 7. While the two-point support is not as stable as the four-point support, nevertheless, a greater tractive effect is obtained with the construction shown in Fig. 8 and there is less tendency to skid. Furthermore, the ends of the calk 31 serve to protect the depending lobes from wear until said ends have been worn down substantially to the level of said lobes. It will be understood that in service the link oscillates on the free ends of the calk and hence, with construction shown in Figs. 6 and 7, a certain amount of wear will take place on the depending lobes 27 even before the ends of the calk have been worn down to the level of said lobes.

An inspection of Figs. 6 and 8 will show that the apex of the V-shaped calk rises approximately to the level of the tire engaging lobes of the link. This has the advantage of providing an additional tire engaging member intervening between and partly filling the gap between the two tire engaging lobes. It is common practice today to provide rubber tire treads with ribs intersected by deep transverse grooves and when an anti-skid chain is applied to such tires there is a tendency for the cross chain links to catch in the grooves, particularly at the outer edges of the tire tread. A side strand may drop into a transverse groove and thereby prevent the chain from creeping. When this occurs the hooks which connect the cross chain to the side chains will rub against the side walls of the tire every time the cross chain is run over, and eventually will wear through to the canvas. By arranging the calk to provide an intermediate point of support between the tire engaging lobes the side strands are prevented from catching in the tread grooves. Referring to Fig. 10, it will be noted that a portion of the tread of a tire is shown at 35 and the transverse grooves in the tread are indicated at 36. In the drawings, the left-hand side strand of the curb link 30 is directly under one of the grooves 36, and under ordinary circumstances said side strand would enter and catch in said groove. However, since the apex 37 of the calk 31 rises between the lobes 38 to approximately the height of said lobes, the tire tread is supported on part 37 as well as on the right-hand lobe 38 and hence the left-hand side strand is prevented from entering the groove 36 to such an extent as to become caught therein.

While I have described my invention as applied to a curb link it will be evident that it is applicable also to other forms of tread links. It will be understood that the embodiments shown in the drawings and described above are to be taken merely as illustrative and not as limitative of my invention, and that I reserve the right to make various changes in form, construction and arrangement of parts without departing from the spirit and scope of my invention as set forth in the claims.

I claim:

1. In an anti-skid device, a tread link consisting of a pair of side strands connected at opposite ends thereof to form a closed loop, and a V-shaped member secured to the link with the apex of the V seated between the side strands of the link and the legs of the V projecting downwardly below the plane of the lowermost portions of the link and laterally beyond the sides of the link.

2. In an anti-skid device, a tread link consisting of a pair of side strands connected at opposite ends thereof to form an elongated loop, and a V-shaped member secured to the side strands of the link with the apex of the V seated between said strands and the legs of the V projecting downwardly below the plane of the lowermost portions of the link and laterally beyond the sides of the link, the V-shaped member lying in a plane normal to the longitudinal axis of the link.

3. In an anti-skid device, a tread member consisting of a curb link, and a V-shaped calk secured to the side strands of the link with the apex of the V seated between said strands, the legs of the V projecting downwardly below the lowermost portions of the road engaging lobes of the link and laterally beyond the sides of the link.

4. In an anti-skid device, a tread member consisting of a curb link, and a V-shaped calk secured to the side strands of the link with the apex of the V seated between said strands and the legs of the V projecting downwardly below the lowermost portions of the road engaging lobes of the link and laterally beyond the sides of the link, the V-shaped calk lying in a plane substantially normal to the longitudinal axis of the link.

5. In an anti-skid device, a tread member consisting of a link of the form of an elongated closed loop, and a pair of V-shaped members secured to the side strands of the link with their apices disposed between the strands and with the legs of one V projecting from one face of the link and the legs of the other V projecting from the other face of the link, the legs of each V projecting laterally beyond the sides of the link.

6. In an anti-skid device, a tread member consisting of a link in the form of an elongated closed loop, and a pair of V-shaped members secured to each other and to the side strands of the link with their apices disposed between the strands, the legs of one V projecting from one face of the link and the legs of the other V projecting from the other face of the link, said V-shaped members being disposed in a common plane substantially normal to the longitudinal axis of the link and the legs of each V projecting laterally beyond the sides of the link.

7. In an anti-skid device, a tread member consisting of a curb link, and a pair of V-shaped members secured to the side strands of the link with their apices disposed between the strands and with the legs of one V projecting from one face of the link and the legs of the other V projecting from the other face of the link, the legs of each V projecting laterally beyond the sides of the link.

8. In an anti-skid device, a tread member consisting of a curb link, and a pair of V-shaped members secured to each other and to the side strands of the link with their apices disposed between the strands, the legs of one V projecting from one face of the link and the legs of the other V extending from the other face of the link, said V-shaped members being disposed in a common plane substantially normal to the longitudinal axis of the link and the legs of each V projecting laterally beyond the sides of the link.

9. A tread link comprising an elongated closed loop having spaced road engaging faces and provided with an inverted V-shaped calk located within and bridging and secured to the side strands of said link with the ends of the legs of the V projecting below the plane of the lowermost portions of said road engaging faces.

10. A tread link comprising an elongated closed loop having spaced road engaging faces and provided with an inverted V-shaped calk located within said link in a plane intersecting the vertical central longitudinal plane of the link and secured to the side strands of said link, the ends of the legs of said V projecting below the plane of the lowermost portions of said road engaging faces of the link.

11. A curb tread link provided with an inverted V-shaped calk located within and bridging and secured to the side strands of said link with the ends of the legs of the V extending downwardly below the road engaging lobes of the link.

12. A curb tread link provided with an inverted V-shaped calk provided with straight legs and located in a plane intersecting the vertical central longitudinal plane of the link with the legs secured to the side strands of said link and with the ends of said legs located below the road engaging lobes of the link.

13. A curb tread link provided with an inverted V-shaped calk located within and bridging and secured to the side strands of said link at points adjacent to the tire engaging lobes of the link and having its legs projecting downwardly below the road engaging lobes of the link.

14. A curb tread link provided with an inverted V-shaped calk located within and bridging and secured to the side strands of the link at points adjacent to the road engaging lobes of the link, the ends of the legs of the V projecting downwardly below the plane of the lowermost portions of the road engaging lobes.

15. A curb tread link provided with a V-shaped calk located within and extending diagonally of said link and secured to the side strands adjacent to the road engaging lobes of the link with the apex of the V projecting substantially to the same height as the tire engaging lobes of the link.

PRESTON M. HALL.